United States Patent
Schlaupitz et al.

(10) Patent No.: US 10,040,490 B2
(45) Date of Patent: Aug. 7, 2018

(54) CARGO SYSTEM FOR A VEHICLE

(71) Applicant: GM GLOBAL TECHNOLOGY OPERATIONS LLC, Detroit, MI (US)

(72) Inventors: Eric E. Schlaupitz, Rochester Hills, MI (US); Kyle Zidek, Fargo, ND (US); Peter C. Baron, Clarkston, MI (US); Scott Parish, Rochester Hills, MI (US); Keith C. Berry, Rochester Hills, MI (US); William J. Majewski, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 15/218,109

(22) Filed: Jul. 25, 2016

(65) Prior Publication Data

US 2018/0022398 A1 Jan. 25, 2018

(51) Int. Cl.
| | |
|---|---|
| *B60R 9/00* | (2006.01) |
| *B62D 33/02* | (2006.01) |
| *B60R 9/10* | (2006.01) |

(52) U.S. Cl.
CPC ............ *B62D 33/0207* (2013.01); *B60R 9/00* (2013.01); *B60R 9/10* (2013.01)

(58) Field of Classification Search
CPC ..... B60R 9/00; B60R 2011/004; B60R 11/00; B60R 11/06
USPC ............ 224/402–405, 924; 296/3, 37.6, 39.2
See application file for complete search history.

(56) References Cited

U.S. PATENT DOCUMENTS

| | | | | |
|---|---|---|---|---|
| 3,068,038 A | * | 12/1962 | Douglass, Jr. ......... | B62D 33/08 224/404 |
| 3,877,622 A | * | 4/1975 | McLain ................... | B60R 9/10 211/17 |
| 4,353,182 A | * | 10/1982 | Junkas ................... | A01K 97/06 206/315.11 |
| 5,037,152 A | * | 8/1991 | Hendricks ................ | B60R 9/00 296/26.06 |
| 5,238,280 A | * | 8/1993 | Christensen ............. | B60R 9/00 296/3 |
| 5,303,858 A | * | 4/1994 | Price ....................... | B60P 3/073 224/282 |
| 5,882,058 A | * | 3/1999 | Karrer ..................... | B60J 7/141 280/748 |
| 6,913,175 B2 | * | 7/2005 | Martin ..................... | B60R 9/00 224/403 |

(Continued)

*Primary Examiner* — Adam Waggenspack
(74) *Attorney, Agent, or Firm* — Quinn IP Law

(57) ABSTRACT

A vehicle includes a first sidewall, a second sidewall and a floor cooperating with the first and second sidewalls to at least partially define a cargo area. A cargo system is provided on an upper surface of at least one of the first and second sidewalls of the storage compartment. The cargo system includes at least one rail disposed on and extending longitudinally along an upper surface of one or more of the first and second sidewalls, the at least one rail having an elongate rail body including one or more slots provided therein. At least one support mechanism including at least one member is adjustably positioned on the rail body between a stored position wherein an inner surface of the at least one member at least partially covers the rail body and a deployed position wherein the inner surface is positioned to receive and support one or more items.

20 Claims, 6 Drawing Sheets

(56) References Cited

U.S. PATENT DOCUMENTS 8,789,867 B2 * 7/2014 Kong .................. B60N 2/4686
  224/282
2016/0236604 A1 * 8/2016 Parlow .................. B60N 3/103

* cited by examiner

CARGO SYSTEM FOR A VEHICLE

TECHNICAL FIELD

The present disclosure relates to a cargo system for a vehicle, and more particularly, to a configurable and deployable cargo system for a pickup truck.

BACKGROUND

Pickup trucks and utility vehicles are often provided with a bed or cargo bay for transporting cargo. Vehicle beds are typically used to carry or haul cargo, but, with the attachment of accessory devices, it may be possible to expand the utility of such vehicles. A variety of items are available for utilizing the cargo space.

For example, bed dividers can be purchased as an aftermarket item. Horizontal dividers can also be installed to enable tiered storage. Ladder racks are also commercially available. While useful, these items are often expensive. Moreover, each of these must be purchased as separate items. When not in use, these items must generally be removed from the vehicle and stored off-board. Storing a bed divider, a tiered storage divider, and a ladder rack requires a significant amount of storage space.

Many of these vehicles also have a cargo cover or tonneau cover to cover the bed to protect the interior of the cargo cover and any items stored therein. The cover may be made as a one-piece panel or a multiple sections of panels that are attached or secured to the vehicle, and may be made of rigid panels that are foldable and/or removable, or a flexible fabric material that may be rolled up and stored when not in use. Many dividers or racks cannot receive and store items without removal of the tonneau cover from its position over the cargo area.

SUMMARY

A vehicle includes a first sidewall, a second sidewall, an upper surface defined in at least one of the first sidewall and second sidewall and a floor cooperating with the opposing first and second sidewalls to at least partially define a cargo area. A cargo system is provided on the upper surface of one or more of the first and second sidewalls of the storage compartment. The cargo system includes at least one rail disposed on and extending longitudinally along the upper surface of one or more of the opposing first and second sidewalls, the at least one rail having an elongate rail body including one or more slots provided therein. At least one support mechanism including at least one member is adjustably positioned on the rail body between a stored position wherein an inner surface of the at least one member at least partially covers the rail body and a deployed position wherein the inner surface is positioned to receive and support one or more items.

The one or more slots in the elongate rail body of the at least one rail may include a first slot provided in an upward facing surface of the elongate rail body, a second slot provided in an inboard facing surface of the elongate rail body and a third slot provided in an outboard facing surface of the elongate rail body. A support disposed on the inboard facing surface of the rail body is configured to receive and support a tonneau cover. The at least one member of the at least one support mechanism may include a first member disposed on a first portion of the rail body and an opposing second member disposed on a second portion of the rail body.

The at least one rail of the vehicle further comprises a first rail disposed on an upper surface of the first sidewall and a second rail disposed on an upper surface of the opposing second sidewall. At least one cargo rack is integrally provided on the first and second rails and includes a first stanchion extending from the first rail, a second stanchion extending from the second rail and a crossbar portion extending between and connecting the first and second stanchions above the cargo area of the storage compartment.

A first end of each of the first and second stanchions is operatively connected to the first and second rails to adjustably positioned the first and second stanchions between a stored position disposed adjacent to and generally planar with the first and second rails and a deployed position wherein the first and second stanchions extend from an upper surface of the first and second rails. The crossbar portion of the at least one rack further comprises first and second crossbar sections each rotatably mounted to a second end of the first and second stanchions that are positionable between a stored position disposed adjacent to and generally parallel with the first and second stanchions and a deployed position extending from the first and second stanchions, wherein the first crossbar section in the deployed position releasably engages the second crossbar section in the deployed position to form the crossbar portion. The at least one cargo rack further comprises a first cargo rack and an opposing second cargo rack, wherein each of the first and second cargo racks extend from the first and second rails above the cargo area of the storage compartment.

In another embodiment of the disclosure, a cargo system for a vehicle includes a cargo area at least partially defined by a first sidewall, a second sidewall, an upper surface defined in at least one of the first sidewall and second sidewall and a floor extending between the first and second sidewalls. The cargo system includes a first rail disposed on and extending longitudinally along the upper surface of the first sidewall having an elongate rail body including one or more slots provided therein and a second rail disposed on and extending longitudinally along the upper surface of the second sidewall having an elongate rail body including one or more slots provided therein. At least one support mechanism includes at least one member adjustably positioned on the rail body between a stored position wherein an inner surface of the at least one member at least partially covers the rail body and a deployed position wherein the inner surface is positioned to receive and support one or more items.

The one or more slots in the elongate rail body of the at least one rail may include a first slot provided in an upward facing surface of the elongate rail body, a second slot provided in an inboard facing surface of the elongate rail body and a third slot provided in an outboard facing surface of the elongate rail body. The at least one member of the at least one support mechanism may include a first member disposed on a first portion of the rail body and an opposing second member disposed on a second portion of the rail body.

The at least one rail of the vehicle further includes a first rail disposed on an upper surface of the first sidewall and a second rail disposed on an upper surface of the opposing second sidewall. At least one cargo rack is integrally provided on the first and second rails and includes a first stanchion extending from the first rail, a second stanchion extending from the second rail and a crossbar portion extending between and connecting the first and second stanchions above the cargo area. A first end of each of the first and second stanchions is operatively connected to the first and second rails to adjustably positioned the first and second stanchions between a stored position disposed adjacent to and generally planar with the first and second rails and a deployed position wherein the first and second stanchions extend from an upper surface of the first and second rails.

The crossbar portion of the at least one rack further includes first and second crossbar sections each rotatably mounted to a second end of the first and second stanchions that are positionable between a stored position disposed adjacent to and generally parallel with the first and second stanchions and a deployed position extending from the first and second stanchions, wherein the first crossbar section in the deployed position releasably engages the second crossbar section in the deployed position to form the crossbar portion. The at least one cargo rack further includes a first cargo rack and an opposing second cargo rack, wherein each of the first and second cargo racks extend from the first and second rails above the cargo area.

In yet another embodiment of the disclosure, a cargo system for a vehicle having a cargo area at least partially defined by a first sidewall, an opposing second sidewall and a floor extending between the first and second sidewalls includes a first rail disposed on and extending longitudinally along an upper surface of the first sidewall having an elongate rail body including one or more slots provided therein. A second rail is disposed on and extending longitudinally along an upper surface of the second sidewall having an elongate rail body including one or more slots provided therein.

At least one support mechanism includes at least one member adjustably positioned on the rail body of the first and second rails between a stored position wherein an inner surface of the at least one member at least partially covers the rail body and a deployed position wherein the inner surface receives and supports one or more items. At least one cargo rack is integral to the first and second rails, the at least one cargo rack including a first stanchion extending from the first rail, a second stanchion extending from the second rail and a crossbar portion extending between and connecting the first and second stanchions above the cargo area.

The one or more slots provided in the elongate rail body of the at least one rail further includes a first slot provided in an upward facing surface of the elongate rail body, a second slot provided in an inboard facing surface of the elongate rail body and a third slot provided in an outboard facing surface of the elongate rail body. A first end of each of the first and second stanchions is operatively connected to the first and second rails to adjustably positioned the first and second stanchions between a stored position disposed adjacent to and generally planar with the first and second rails and a deployed position wherein the first and second stanchions extend from an upper surface of the first and second rails. The crossbar portion further includes first and second crossbar sections each rotatably mounted to a second end of the first and second stanchions that are positionable between a stored position disposed adjacent to and generally parallel with the first and second stanchions and a deployed position extending from the first and second stanchions, wherein the first crossbar section in the deployed position releasably engages the second crossbar section in the deployed position to form the crossbar portion.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
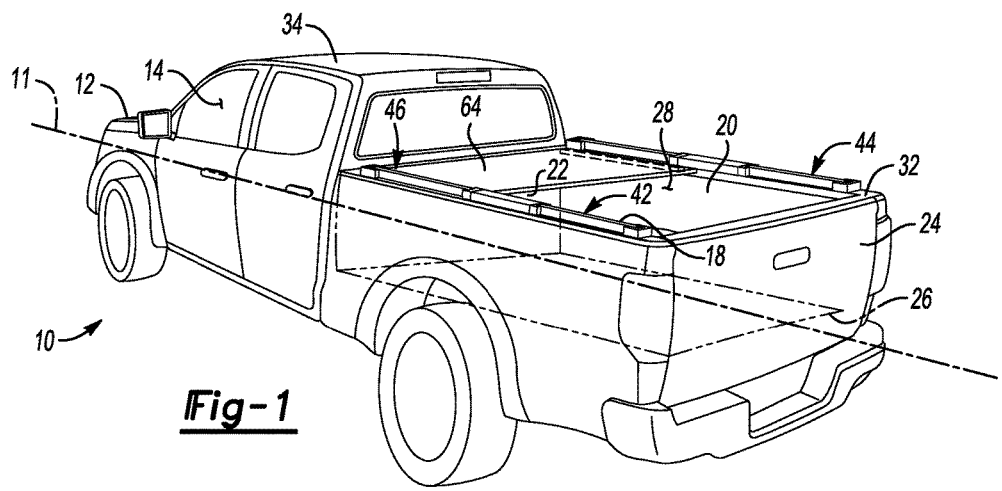
FIG. 1 is a schematic, perspective view of a vehicle and a cargo system for use with the vehicle.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 10. Vehicle 10 is shown for illustrative purposes and demonstrates only one possible environment into which a storage compartment or area 16 may be defined. It is understood that the vehicle may be any mobile platform, such as an airplane, all-terrain vehicle (ATV), boat, personal movement device, robot and the like to accomplish the purposes of this disclosure.

It is understood that use of direction terms relative to the vehicle orientation may be used throughout the description regarding location of the components within the vehicle 10. Thus, the forward direction would be toward an engine compartment for the vehicle 10 and opposite the rear end of the vehicle 10. FIG. 1 shows a vehicle 10 depicted as a pickup truck. The vehicle 10 includes a vehicle body 12. The vehicle body 12 defines a passenger compartment 14 and a storage compartment 16. As shown in FIG. 1, the passenger compartment 14 is depicted as a truck cab, while the storage compartment 16 is configured as an exposed cargo area or truck bed that is generally adapted to carry cargo. A longitudinal axis 11 extends through the storage compartment 16 at a rear end of the vehicle 10 and the passenger compartment 14 at a front end of the vehicle 10.

The storage compartment 16 of FIG. 1 is enclosable on four sides. The storage compartment 16 includes one or more sidewalls forming generally vertical perimeter walls, shown as a first sidewall 18 and an opposing second sidewall 20. The first sidewall 18 is arranged on one side of the longitudinal axis 11 and is configured as a left sidewall of the bed, while the second sidewall 20 is arranged on the other side of the axis, and is therefore configured as a right sidewall 20 opposing the left sidewall 18. The storage compartment 16 also includes a third sidewall or front wall 22, a fourth sidewall or tailgate 24, and a floor 26. The first sidewall 18 and the second sidewall 20 are arranged substantially parallel to each other and extend generally parallel with and opposing sides of the longitudinal axis 11. Further, the front wall 22 extends substantially parallel relative to the tailgate 24 and generally perpendicular to the longitudinal axis 11.

The sidewalls 18, 20 and the floor 26 together at least partially define a tonneau or cargo area 28. It is understood that the front wall 22 and tailgate 24 may also cooperate with the sidewalls 18, 20 and floor 26 to define the cargo area 28. The tailgate 24 may define a rearward end of the cargo area 28, and the front wall 22 may define a forward end of the cargo area 28. Accordingly, the front wall 22 and the tailgate 24 cooperate with the first sidewall 18 and the second sidewall 20 to define a perimeter of the cargo area 28.

The floor or truck bed 26 of the vehicle 10 extends generally laterally between the first sidewall 18 and the second sidewall 20, and longitudinally between the front wall 22 and the tailgate 24. The floor 26 generally defines a lower surface 30 of the cargo area 28. While the vehicle 10 is shown as a pickup truck, it should be appreciated that it may be any vehicle that has walls and a floor or a base defining a cargo area. As shown in FIG. 1, the tailgate 24 may be pivotally connected to the sidewalls 18 and 20 or a portion of the floor 26 or other rearwardly disposed portion of the vehicle body 12 for ease of loading and unloading the cargo area 28.

The first sidewall 18 and the opposing second sidewall 20 each include an upper edge 32 that defines an upper surface disposed above the lower surface 30 of the cargo area 28 defined by the floor 26. The upper edge or surface 32 of the first sidewall 18 and opposing second sidewall 20 are disposed at a vertical elevation between the lower surface 30 of the floor 26 and a roof surface 34 of the passenger compartment 14 of the vehicle 10.

Figure 2:
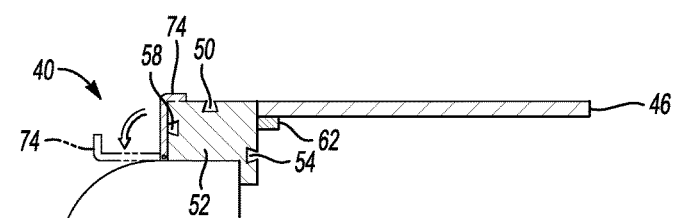
FIG. 2 is a rear plan view of the cargo system mounted on a sidewall of the vehicle.
Figure 3:
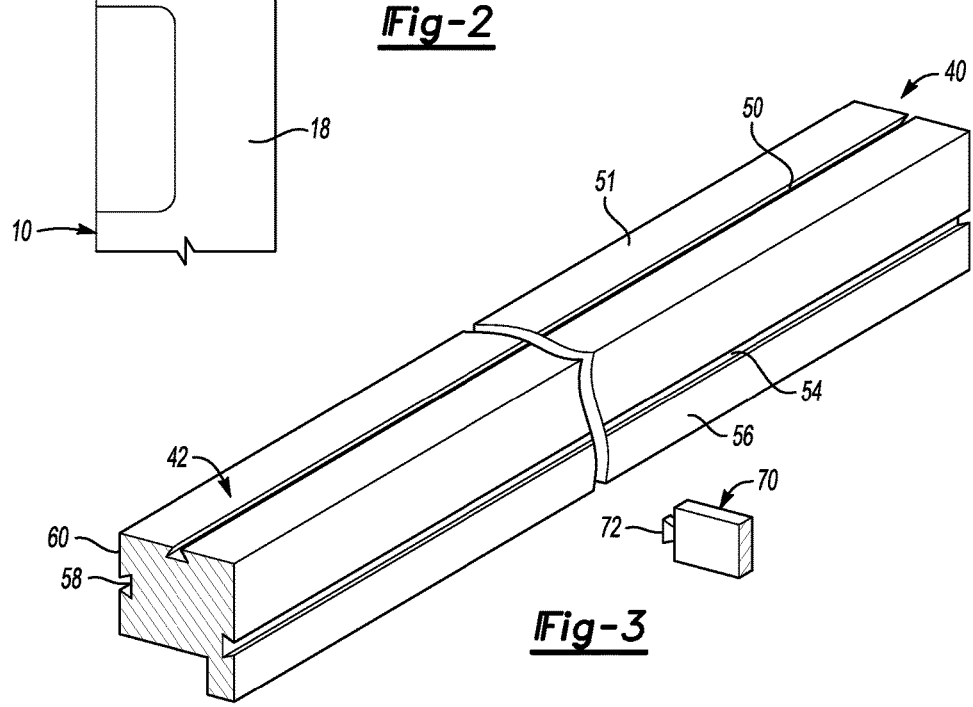
FIG. 3 is a perspective view of an elongate rail body of at least one rail of the cargo system.

Referring additionally now to FIGS. 2 and 3, a cargo system 40 for use with a vehicle 10 is described in greater detail. Cargo system 40 includes at least one rail 42 disposed on the upper surface 32 of one or more of the sidewalls 18, 20 of the vehicle 10. The at least one rail 42 extends longitudinally along an upper surface 32 of the one or more sidewalls 18, 20 and generally parallel with the longitudinal axis 11. The at least one rail 42 may be welded, bolted, fastened, or otherwise secured to the sidewalls 18, 20 such that the at least one rail 42 is thus integrated into the vehicle 10.

In one embodiment of the disclosure, the at least one rail 42 of cargo system 40 includes a first rail 42 extending longitudinally along the upper edge or surface 32 of first sidewall 18 and an opposing second rail 44 extending longitudinally along the upper edge or surface 32 of the second sidewall 20. It is understood that the first and second rails 42, 44 may have identical configurations or may be different based upon desired functions for the rails. As further discussed below, the rails 42, 44 may be configured to be dual-purpose rails in that they support a tonneau cover 46 as well as receive and support one or more items for transport on the vehicle 10.

In the embodiment shown in the Figures, second rail 44 may be a mirror image of the first rail 42. The at least one rail 42 includes one or more slots 50 provided in the rail body 52. The one or more slots 50 may include an upward opening slot 50 that extends longitudinally along the at least one rail 42 in an upward facing surface 51 of the rail body 52. An inward opening slot 54 extends longitudinally along an inboard facing surface 56 in the at least one rail body 52 so that the slot 54 opens in an inward or inboard direction.

It is also contemplated that the rail body 52 of at least one rail 42 may include an outward opening slot 58 that extends longitudinally along an outboard facing surface 60 of rail body 52 so that the slot 58 opens in an outward or outboard direction. The slot 50 is referred to herein as a first longitudinal slot, the slot 54 is referred to as a second longitudinal slot and the slot 58 is referred to herein as a third longitudinal slot. As used herein, an "inboard" direction is a direction toward a longitudinal axis 11 or centerline of the vehicle 10 and an "outboard" direction is an opposing side from the "inboard" direction. Slots 50, 54, 58 may extend the full length of the rail body 52 to open at a rearward-facing end of the rail body 52. Alternatively, slots 50, 54, 58 may be formed in a portion of the rail body 52. It is also contemplated that the slots 50, 54, 58 are longitudinal slots running fore and aft along the rail body 52. Slots 50, 54, 58 may be generally T-shaped as shown in FIG. 3, though the slots 50, 54, 58 may be formed with different geometries and each of slots 50, 54, 58 need not be the same length and/or shape.

The at least one rail 42 further includes a support 62 disposed on the inboard facing surface 56 of the rail body 52. In one embodiment of the disclosure, support 62 is provided on the inboard facing surfaces 56 of the rail body 52 of the first and second rails 42, 44 to receive and support the tonneau cover 46. Supports 62 are configured to support the tonneau cover 46 above the vehicle floor 26. Tonneau cover or multi-section panel 46 is configured to at least partially cover the cargo area 28 and extend substantially perpendicular to the opposing sidewalls 18, 20 and generally parallel to the floor 26 of the vehicle 10.

The tonneau cover 46 may include one or more panels 64. As is shown in FIG. 1, the one or more panels 64 of the tonneau cover 46 is disposed closest to the front wall 22 of the vehicle 10 and may extend through cargo area 28 to the perimeter closest to the tailgate 24. The tonneau cover 46 also may have multiple panels depending upon such factors as the size of the cargo area 28 and the sizes of the one or more panels. The one or more panels 64 may be releasably interconnected such that the panels may move together or they may be configured to move independently of each other.

In another embodiment of the disclosure shown in FIG. 3, a cargo retainer 70 includes one or more projections or support posts 72 that are sized to be removably secured within the slot 54 on the inboard facing surface 56 of the rail body 52. Slots 54 are configured to receive and secure terminal ends of the support posts 72 of the cargo retainer 70. Slots 54 support the cargo retainer 70 such that the cargo retainer 70 spans between the rails 42, 44 above the floor 26 of the cargo area 28 shown in FIG. 1 and extends substantially perpendicular to the sidewalls 18, 20 and extends substantially parallel to the floor 26 when the floor is in the extended position. Slots 50, 54, 58 may extend to one or both ends of the at least one rail body 52 so that the cargo retainer 70 may be removable from the slots 50, 54, 58 by sliding the cargo retainer 70 past the ends of the rail body 52. The cargo retainer 70 when positioned between first and second sidewalls 18, 20 is configured to be movable along the rails and may divide the cargo area above the load floor 26 to define a forward cargo area and a rearward cargo area.

The at least one rail 42 may additionally include a support mechanism 74 that is adjustably positioned adjacent an outboard facing surface 60 of the at least one rail body 52. Support mechanism 74 may be positioned between at least a stored position, as shown in FIG. 4A, wherein the support mechanism 74 is positioned such that it at least partially covers the outboard facing surface of the rail body and a deployed position, as shown in FIG. 4B, wherein the support mechanism 74 extends away from the rail body 52.

Support mechanism 74 may be adjustably positioned to the rail body 52 of the at least one rail 42 by a set of members 76 that are adjustably connected to the bottom of the rail body 52 when moving from the stowed position to the deployed position. Members 76 may be attached to the rail 42 via hinges 78, bearings, or any other attachment mechanisms that enable the outward and inward movement of the member. It should be appreciated that any attachment mechanism capable of supporting the support mechanism 74 and of moving between a stowed position and a deployed position is also within the scope of the disclosure.

Figure 4A:
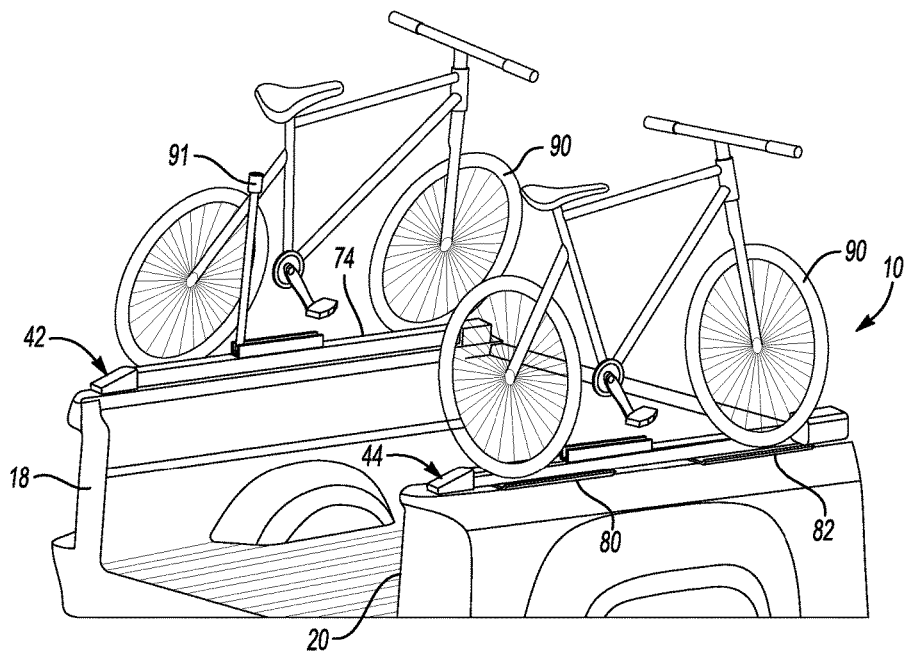
FIG. 4A is a perspective view of the cargo system having first and second rails disposed on first and second sidewalls of the vehicle receiving one or more items for storage.
Figure 4B:
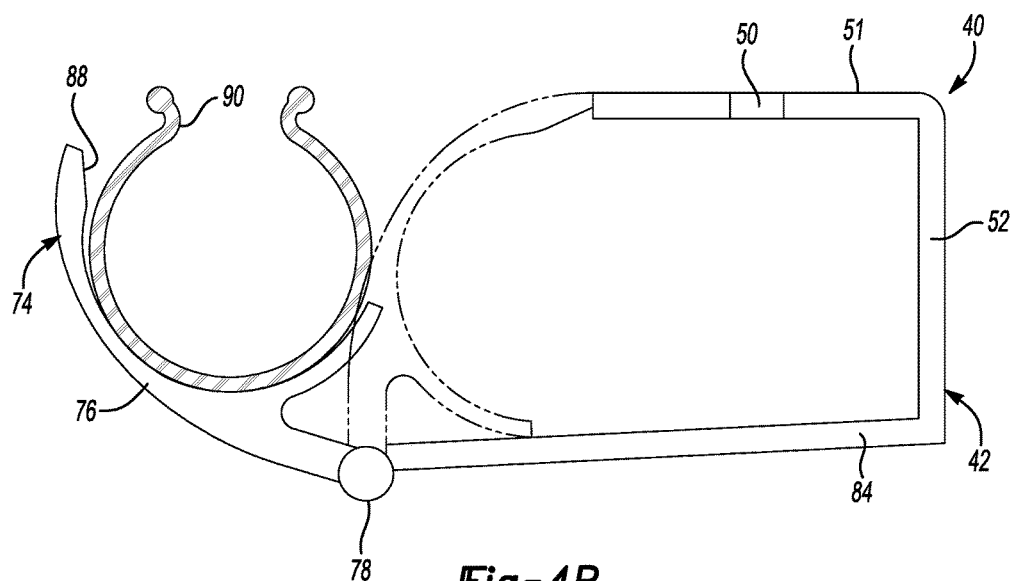
FIG. 4B is a rear plan view of a support mechanism for use with the cargo system in accordance with the present disclosure.

FIGS. 4A and 4B illustrate one embodiment of the support mechanism 74 of the cargo system 40. Members 76 of the support mechanism 74 may include a first member 80 movably secured to the rails 42, 44 disposed on the opposing sidewalls 18, 20 of the vehicle 10 adjacent tailgate 24 and an opposing second member 82 disposed adjacent front wall 22 of the storage compartment 16. Members 80, 82 may be pivotally connected by hinges 78 to a portion of the rail body 52 of the first and second rails 42, 44 to receive one or more items 90. As is shown in the Figures, a retractable handle 91 may be incorporated with the sidewalls 18, 20 and/or rails 42, 44 to provide a gripping portion for entry or exit from the cargo area 28. FIG. 4B illustrates member 80 pivotally connected to a lower portion 84 of the rail body 52.

Figure 5A:
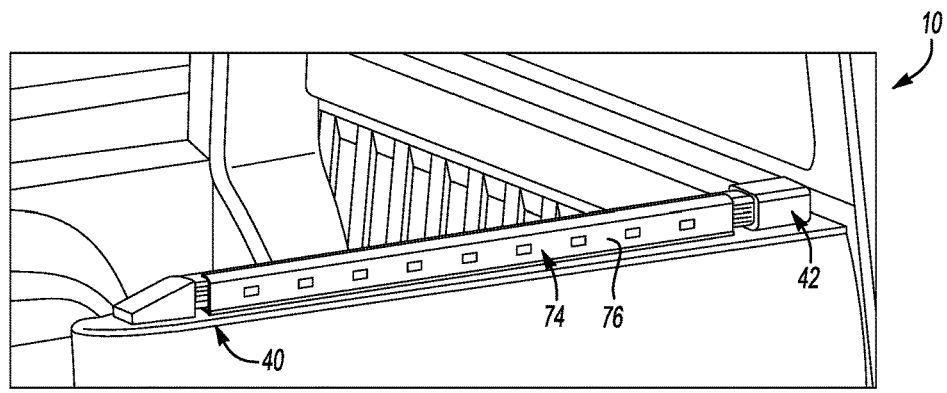
FIG. 5A is a perspective view of the support mechanism positioned in a stored position adjacent the at least one rail of the cargo system.
Figure 5B:
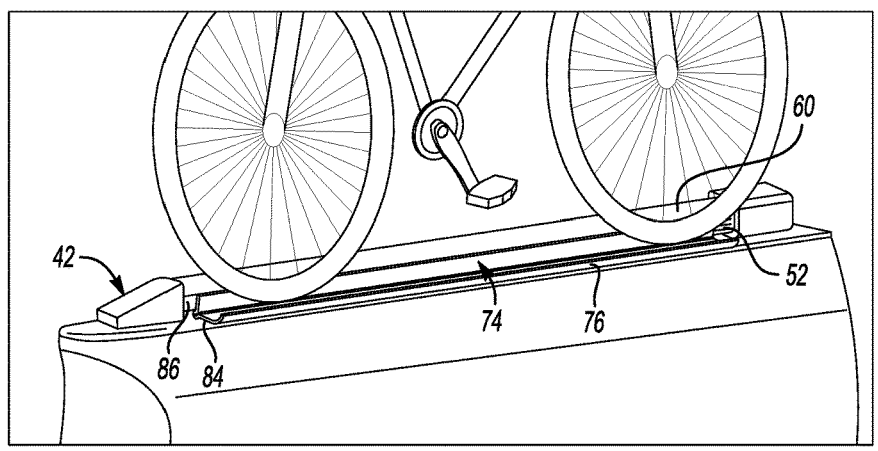
FIG. 5B is a perspective view of the support mechanism positioned in a deployed position adjacent the at least one rail of the cargo system.

As shown in FIGS. 5A and 5B, member 76 of support mechanism 74 of cargo system 40 may be a unitary body extending generally along a longitudinal portion of the outer surface 60 of rail body 52 of the at least one rail 42. FIG. 5B illustrates unitary member 76 pivotally connected to a lower portion 84 of the rail body 52. However, it is understood that member may be movably secured to a central portion 86 of the rail body 52.

Figure 6A:
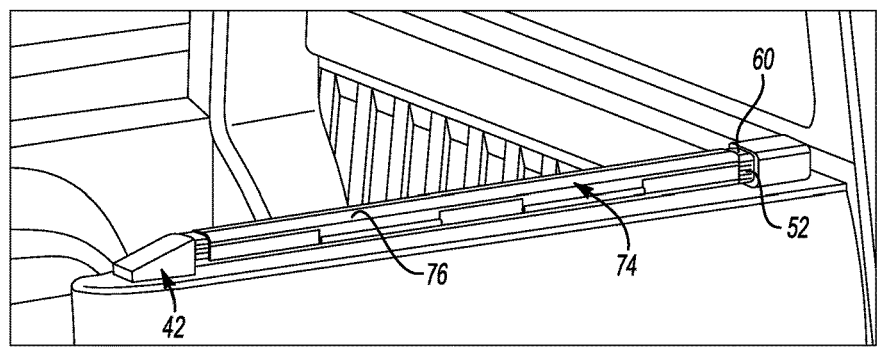
FIG. 6A is a perspective view of another embodiment of the support mechanism positioned in a stored position adjacent the at least one rail of the cargo system.
Figure 6B:
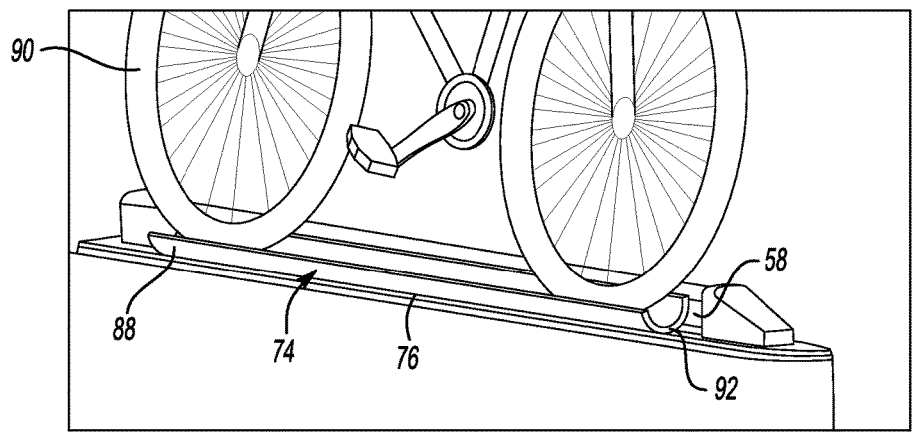
FIG. 6B is a perspective view of another embodiment of the support mechanism positioned in a deployed position adjacent the at least one rail of the cargo system.
Figure 6C:
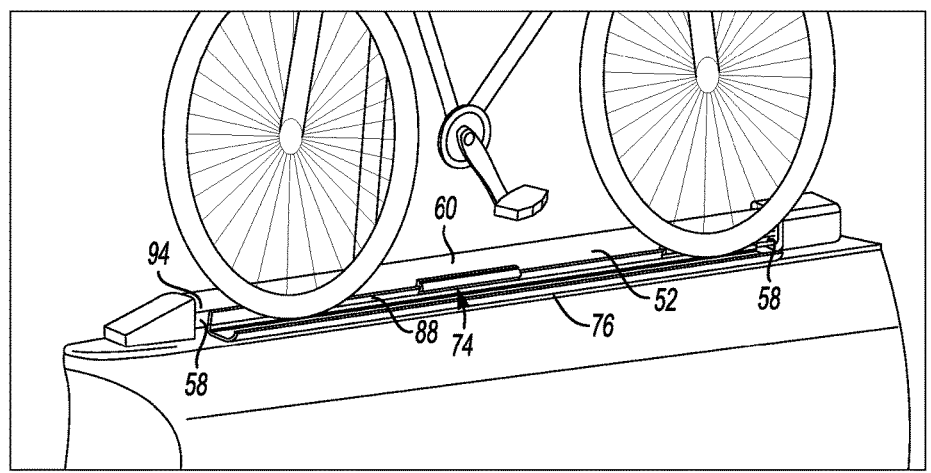
FIG. 6C is a perspective view of the support mechanism mounted in an alternate position to the elongate rail body in a deployed position adjacent the at least one rail of the cargo system.

Referring now to FIGS. 6A-6C, member 76 may be pivotally secured to slot 58 in the outboard surface 60 of the rail body 52 of the at least one rail 42 and positioned between a stored position as shown in FIG. 6A and a deployed position as is illustrated in FIGS. 6B and 6C. In a deployed position shown in FIGS. 6B and 6C, an inner surface 88 of the member 76 is configured to receive and support one or more items 90, such as a bicycle wheel or tire or the like.

In the stored position shown in FIG. 6A, inner surface 88 of the member 76 is disposed above the rail body 52 to at least partially cover the rail body 52. As is shown in FIG. 6B, a portion 92 of member 76 may be secured to the slot 58 of rail body 52. Alternatively, as shown in FIG. 6C, member 76 may be pivotally connected to a mounting member 94 that is received within a slot 58 of the rail body 52.

Figure 7A:
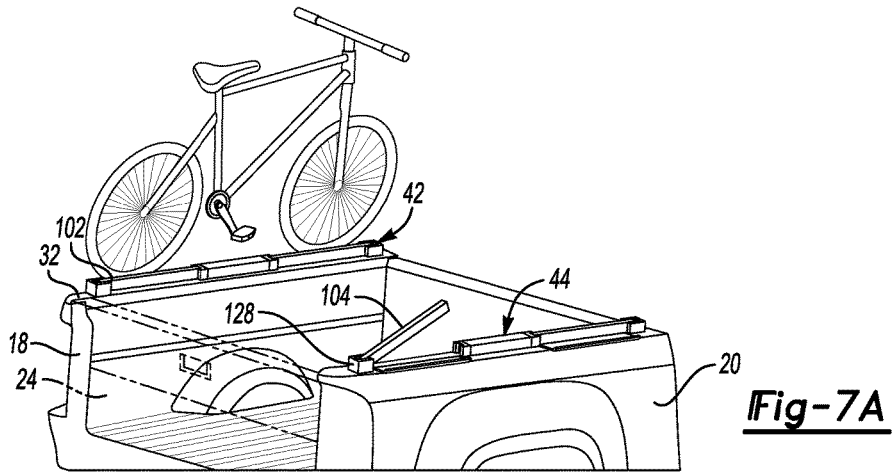
FIG. 7A is a perspective view of a second stanchion extending from the second rail of the cargo system disposed on a vehicle.
Figure 7B:
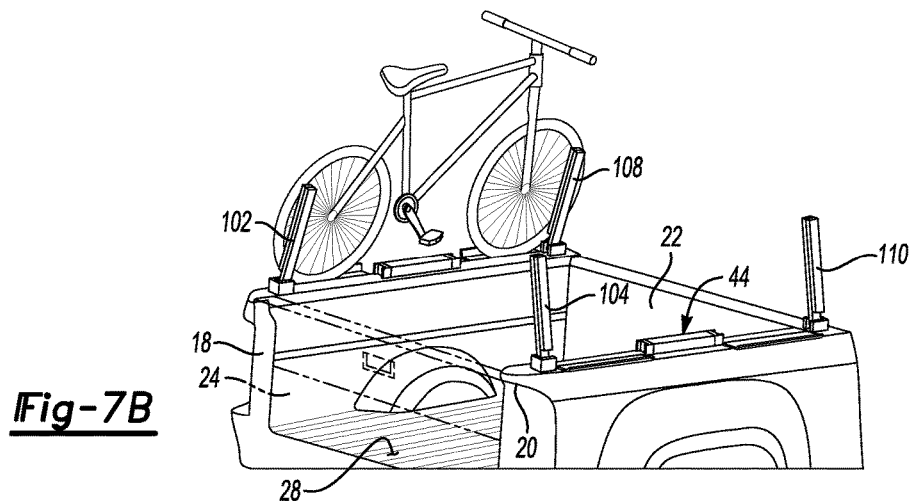
FIG. 7B is a perspective view of first and third stanchions extending upward from a first rail and second and fourth stanchions extending from the second rail of the cargo system.
Figure 7C:
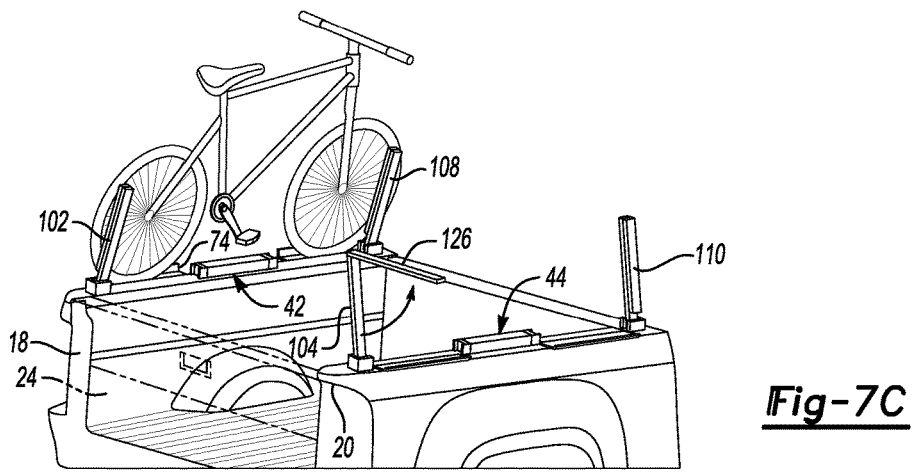
FIG. 7C is a perspective view of a second crossbar section of a crossbar portion rotatably mounted to the second stanchion of a cargo rack of the cargo system.
Figure 7D:
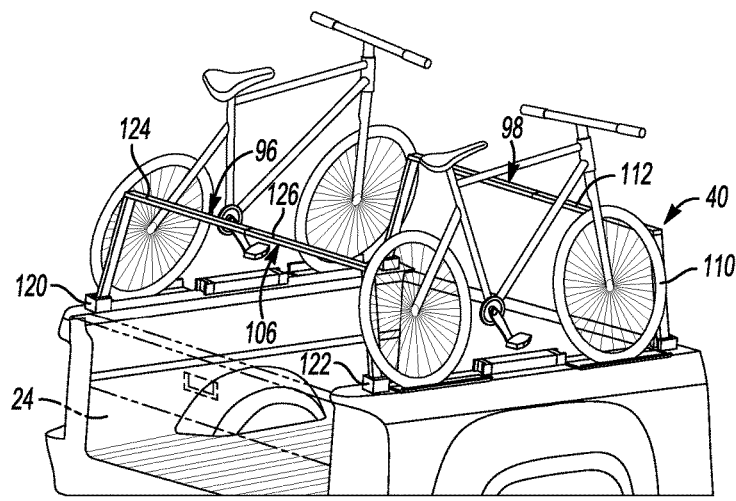
FIG. 7D is a perspective view of first and second cargo racks of the of the cargo system for use with a vehicle.
Figure 8:
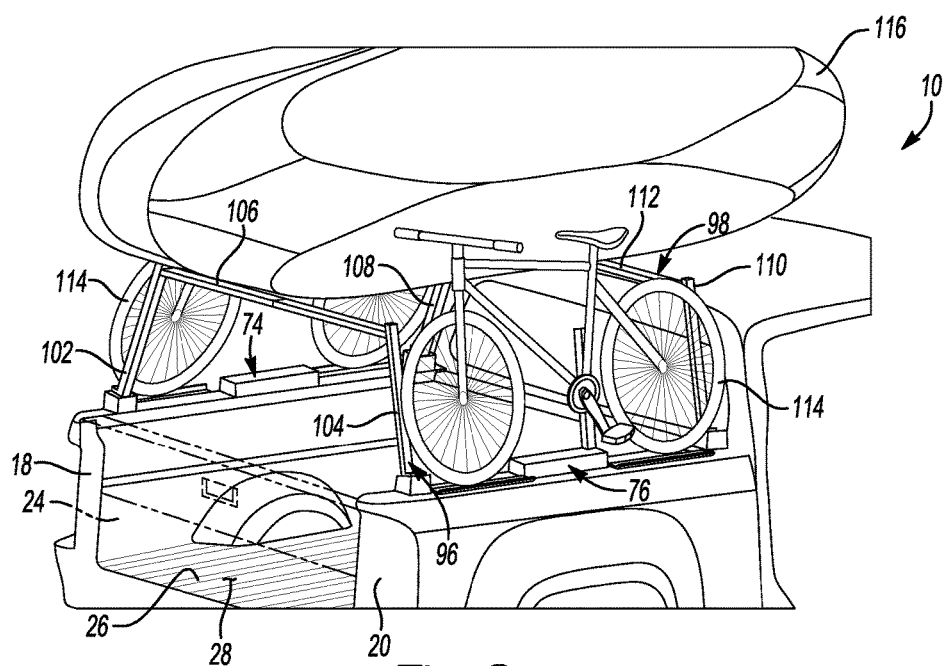
FIG. 8 is a perspective view of the first and second cargo racks of the of the cargo system receiving and storing one or more items for transport on the vehicle in accordance with the present disclosure.

Referring now to FIGS. 7A-7D and 8, the cargo system 40 includes a collapsible cargo rack cooperating with the first and second rails 42, 44 of the cargo system 40. The cargo rack is integrally formed into the first and second rails 42, 44 and may be selectively positioned between at least a stored position as shown in FIG. 7A and a deployed position as shown in FIGS. 7D and 8. The cargo rack may be a modular assembly that is disposed on and adjustably positioned relative to the at least one rail 42, namely, first and second rails 42, 44 to extend between the first sidewall 18 and the second sidewall 20 above cargo area 28. The cargo rack may cooperate with the at least one support mechanism 74 such that the at least one rail 42 includes both the at least one support mechanism and the collapsible cargo rack.

The cargo rack may include a first stanchion 102 extending from an upper edge or surface 32 of the first sidewall 18 and a second stanchion 104 extending from an upper edge or surface 32 of the second sidewall 20 such that the first and second stanchions 102, 104 are supported by and extend above the first and second sidewalls 18, 20. A crossbar portion 106 extends between and connects the first stanchion 102 and second stanchion 104 above cargo area 28 to form a first cargo rack 96.

In one embodiment of the disclosure, the first stanchion 102, second stanchion 104 and crossbar portion 106 of the cargo rack of cargo system 40 are disposed adjacent tailgate 24. A third stanchion 108 extending from the first sidewall 18, a fourth stanchion 110 extending from the second sidewall 20 and a crossbar portion 112 extending between and connecting the third and fourth stanchions 108, 110 forms a second cargo rack 98 that is disposed adjacent the front wall 22 of the storage compartment 16 opposite the first cargo rack 96. Crossbar portions 106, 112 extend laterally across the cargo area 28 and generally perpendicular relative to the longitudinal axis 11. It is also contemplated that the first cargo rack 96 defined by the first stanchion 102, second stanchion 104, and crossbar portion 106 and the second cargo rack 98 defined by the third stanchion 108, fourth stanchion 110 and crossbar portion 112 each generally define a U-shaped cargo rack for cargo system 40.

Referring to FIG. 8, the first and second cargo racks 96, 98 of the cargo system may be configured to receive and support items for transport on the vehicle 10. First stanchion 102 and third stanchion 108 of the first and second cargo racks 96, 98 cooperate to provide a storage area while the second stanchion 104 and fourth stanchion 110 cooperate to form an opposing storage area to support one or more items 114. Items 116 may also be positioned on one or more of the crossbar portion 106 and/or crossbar portion 112 of the first and second cargo racks 96, 98 to secure and store the items 116 thereon.

As is shown in FIG. 7B, second stanchion 104 is operatively connected to the second rail 44 adjacent tailgate 24 at a first connection point 120 while second stanchion 104 is operatively connected to the first rail 42 at a second connection point. Each of the first stanchion 102 and second stanchion 104 may be adjustably positioned between a stored position as shown in FIG. 7A, wherein the first and second stanchions 102, 104 are positioned adjacent to and generally planar with the first and second rails 42, 44 and at least one deployed position, wherein the first and second stanchions 102, 104 are pivotally adjusted about connection points 114, 116 to place the stanchions 102, 104 in a generally vertical position as shown in FIG. 7B.

It is contemplated that the first and second stanchions 102, 104 and crossbar portion 106 may be releasably secured to the first and second sidewalls 42, 44 or may be mounted to be integral with the first and second sidewalls 42, 44. Crossbar portions 106, 112 may be removably secured to first and second stanchions 102, 104 and third and fourth stanchions 108, 110 respectively. Alternatively, as shown in FIG. 7C, the crossbar portion may include a second crossbar section 126 rotatably mounted to the second stanchion 104. The second crossbar section may be positionable between a first or stored position disposed adjacent to and generally parallel with the second stanchion 104 as shown in FIG. 7B and a second or deployed position extending from the second stanchion 104 as shown in FIG. 7D.

Referring again to FIG. 7D, a first crossbar section 124 may be rotatably mounted to the first stanchion 102. First crossbar section 124 may be positionable between a first or stored position disposed adjacent to and generally parallel with the first stanchion 102 as shown in FIG. 7B and a second or deployed position extending from the first stanchion 102 as shown in FIG. 7D to releasably engage the second crossbar section 126 to complete the crossbar portion 106. It is contemplated that a similar arrangement may be provided with the third and fourth stanchions 108, 110 to form the crossbar portion 112.

A stop 128 may be formed into the first and second rails 42, 44 respectively, such as, but not limited to, a ledge, a block or some other physical feature to cooperate with stanchions 102, 104, 108, 110 to secure and support stanchions 102, 104, 108, 110 in position on the rails 42, 44. Alternatively, the stop 128 may include some device capable of locking and/or securing the stanchions 102, 104 108, 110 adjacent the first and second rails 44 respectively.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a storage compartment including a first sidewall, a second sidewall disposed opposite the first sidewall, an upper surface defined in at least one of the first sidewall and second sidewall and a floor cooperating with the opposing first and second sidewalls to at least partially define a cargo area; and
   a cargo system provided on the upper surface of one or more of the first and second sidewalls of the storage compartment, the cargo system having:
      at least one rail having an elongate rail body disposed on and extending longitudinally along the upper surface of one or more of the opposing first and second sidewalls,
      one or more slots formed in the elongate rail body of the at least one rail, the one or more slots including a first slot formed in an upward facing surface of the elongate rail body, a second slot formed in an inboard facing surface of the elongate rail body and a third slot formed in an outboard facing surface of the elongate rail body, and
      at least one support mechanism including at least one member adjustably positioned adjacent the outboard facing surface of the elongate rail body, wherein the at least one member of the at least one support mechanism is adjustable between a stored position wherein an inner surface of the at least one member at least partially covers the outboard facing surface of the elongate rail body and a deployed position wherein the support mechanism extends away from the outboard facing surface of the elongate rail body,
   wherein the inner surface of at least one member of the at least one support mechanism is positioned in the deployed position to receive and support one or more items thereon when the at least one member of the at least one support mechanism is in the deployed position.

2. The vehicle of claim 1 wherein the elongate rail body of the at least one rail further comprises a support disposed on the inboard facing surface of the rail body.

3. The vehicle of claim 1 wherein the storage compartment further comprises:
   a third sidewall extending between and cooperating with the opposing first and second sidewalls, wherein the third sidewall defines a forward end of the cargo area; and
   a fourth sidewall extending between and cooperating with the opposing first and second sidewalls, wherein the fourth sidewall further comprises a tailgate pivotally connected to the first and second sidewalls to define a rearward end of the cargo area,
   wherein the opposing first and second sidewalls, third sidewall and fourth sidewall cooperate with the floor of the vehicle to at least partially define the cargo area.

4. The vehicle of claim 3 wherein the at least one rail further comprises a first rail disposed on an upper surface of the first sidewall and a second rail disposed on an upper surface of the opposing second sidewall.

5. A storage compartment for a vehicle having a cargo area at least partially defined by a first sidewall, an opposing second sidewall, an upper surface defined in at least one of the first sidewall and second sidewall and a floor extending between the first and second sidewalls, the storage compartment comprising:

a cargo system provided on the upper surface of the first and second sidewalls of the storage compartment, the cargo system having:
  a first rail having an elongate rail body disposed on and extending longitudinally along the upper surface of the first sidewall;
  a second rail having an elongate rail body disposed on and extending longitudinally along the upper surface of the second sidewall;
  one or more slots formed in the elongate rail body of each of the first rail and the second rail, the one or more slots including a first slot formed in an upward facing surface of the elongate rail body, a second slot formed in an inboard facing surface of the elongate rail body and a third slot formed in an outboard facing surface of the elongate rail body; and
    at least one support mechanism including at least one member adjustably positioned adjacent the outboard facing surface of the elongate rail body of at least one of the first rail and the second rail, wherein the at least one member of the at least one support mechanism is adjustable between a stored position wherein an inner surface of the at least one member at least partially covers the outboard facing surface of the elongate rail body of each of the first rail and the second rail, and a deployed position wherein the support mechanism extends away from the outboard facing surface of the elongate rail bodies of the first rail and the second rail,
  wherein the inner surface of at least one member of the at least one support mechanism is positioned in the deployed position to receive and support one or more items thereon when the at least one member of the at least one support mechanism is in the deployed position.

6. The vehicle of claim 1 wherein the at least one member of the at least one support mechanism further comprises a member having a unitary body pivotally connected to and extending generally along a longitudinal portion of the outboard facing surface of the elongate rail body.

7. The vehicle of claim 6 wherein the unitary body member of the at least one support mechanism is pivotally connected to a lower portion of the outboard facing surface of the elongate rail body.

8. The vehicle of claim 6 wherein the unitary body member of the at least one support mechanism is pivotally connected to the third slot in the outboard facing surface of the elongate rail body.

9. The vehicle of claim 8 wherein the unitary body member of the at least one support mechanism is pivotally connected to a mounting member received within the third slot in the outboard facing surface of the elongate rail body.

10. The vehicle of claim 3 wherein the at least one member of the at least one support mechanism further comprises:
  a first member movably secured and disposed on a first portion of the outboard facing surface of the elongate rail body of the at least one rail proximate the forward end of the cargo area; and
  a second member disposed on a second portion of the outboard facing surface of the elongate rail body of the at least one rail proximate the rearward end of the cargo area,
  wherein the first member and second member of the at least one support mechanism are each adjustable between a stored position wherein the inner surface of the first member and the second member at least partially covers the outboard facing surface of the elongate rail body and a deployed position wherein the first member and the second member of the least one support mechanism extend away from the outboard facing surface of the elongate rail body such that the inner surfaces of the first member and the second member are positioned to receive and support one or more items thereon.

11. The vehicle of claim 4 further comprising a support disposed on the inboard facing surface of the elongate rail body of the first rail and the second rail, wherein the support extends generally longitudinally along the inboard facing surface of the elongate rail body between the forward end and rearward end of the storage compartment.

12. The vehicle of claim 11 further comprising a tonneau cover including one or more releasably interconnected panels received on and supported by the support disposed on each of the inboard facing surfaces of the elongate rail bodies of the first rail and the second rail to at least partially cover the cargo area.

13. The vehicle of claim 4 further comprising a cargo retainer including one or more support posts removably received within and secured to the second slot on the inboard facing surface of the elongate rail body of each of the first rail and the second rail, wherein the one or more support posts of the cargo retainer extends between the first rail and second rail above the floor of the cargo area.

14. The cargo area of claim 5 wherein the at least one member of the at least one support mechanism further comprises a member having a unitary body pivotally connected to and extending generally along a longitudinal portion of the outboard facing surface of the elongate rail body of each of the first rail and the second rail of the cargo system.

15. The cargo area of claim 14 wherein the unitary body member of the at least one support mechanism is pivotally connected to a lower portion of the outboard facing surface of the elongate rail body of each of the first rail and the second rail.

16. The cargo area of claim 14 wherein the unitary body member of the at least one support mechanism is pivotally connected to the third slot in the outboard facing surface of the elongate rail body of each of the first rail and the second rail.

17. The cargo area of claim 14 wherein the unitary body member of the at least one support mechanism is pivotally connected to a mounting member received within the third slot in the outboard facing surface of the elongate rail body of each of the first rail and the second rail.

18. The cargo area of claim 5 wherein the storage compartment further comprises:
  a third sidewall extending between and cooperating with the opposing first and second sidewalls, wherein the third sidewall defines a forward end of the cargo area; and
  a fourth sidewall extending between and cooperating with the opposing first and second sidewalls, wherein the fourth sidewall further comprises a tailgate pivotally connected to the first and second sidewalls to define a rearward end of the cargo area,
  wherein the opposing first and second sidewalls, third sidewall and fourth sidewall cooperate with the floor of the vehicle to at least partially define the cargo area.

19. The cargo area of claim 18 wherein the at least one member of the at least one support mechanism further comprises:

a first member movably secured and disposed on a first portion of the outboard facing surface of the elongate rail body of the at least one rail proximate the forward end of the cargo area; and a second member disposed on a second portion of the outboard facing surface of the elongate rail body of the at least one rail proximate the rearward end of the cargo area, wherein the first member and second member of the at least one support mechanism are each adjustable between a stored position wherein the inner surface of the first member and second member at least partially covers the outboard facing surface of the elongate rail body and a deployed position wherein the first member and second member of the least one support mechanism extend away from the outboard facing surface of the elongate rail body such that the inner surfaces of the first member and second member are positioned to receive and support one or more items thereon.

20. The cargo area of claim 5 further comprising a cargo retainer including one or more support posts removably received within and secured to the second slot on the inboard facing surface of the elongate rail body of each of the first rail and the second rail, wherein the one or more support posts of the cargo retainer extends between the first rail and second rail above the floor of the cargo area.

\* \* \* \* \*